United States Patent [19]

Couture

[11] 4,030,671
[45] June 21, 1977

[54] APPARATUS FOR PULPING WASTE PAPER MATERIALS

[75] Inventor: Joseph Walter Couture, Dorval, Canada

[73] Assignee: The Black Clawson Company, Middletown, Ohio

[22] Filed: June 4, 1976

[21] Appl. No.: 692,885

[52] U.S. Cl. .............................. 241/15; 241/46.17
[51] Int. Cl.² ........................................ B02C 23/36
[58] Field of Search ................. 241/15, 20, 21, 24, 241/46.11, 46.17, 79, 79.1, 80

[56] References Cited
UNITED STATES PATENTS

| | | | |
|---|---|---|---|
| 3,339,851 | 9/1967 | Felton et al. | 241/46.17 |
| 3,549,092 | 12/1970 | Baxter, Jr. | 241/46.17 |
| 3,716,197 | 2/1973 | Craig et al. | 241/46.17 |
| 3,720,380 | 3/1973 | Marsh | 241/24 |
| 3,736,223 | 5/1973 | Marsh | 241/15 |
| 3,925,150 | 12/1975 | Marsh | 241/24 |

Primary Examiner—Granville Y. Custer, Jr.
Attorney, Agent, or Firm—Biebel, French & Nauman

[57] ABSTRACT

Recovery of paper fiber for reuse for waste paper materials containing plastic sheet and film is facilitated by the combination of a pulper in which the waste paper materials are pulped in a pulper equipped with a junk remover connected with the bottom of the pulper tub by a chute and provided with a pump constructed and arranged to maintain the hydrostatic head in the tub at a higher effective level than in the junk remover tower by circulating liquid from the tower back to the tub. The result is to cause transfer of the plastic and other lightweight trash to the junk remover for removal by its conveyor buckets and to prevent accumulation of lightweight trash in the tub to the extent that it interferes with extraction of the defibered paper slurry.

8 Claims, 4 Drawing Figures

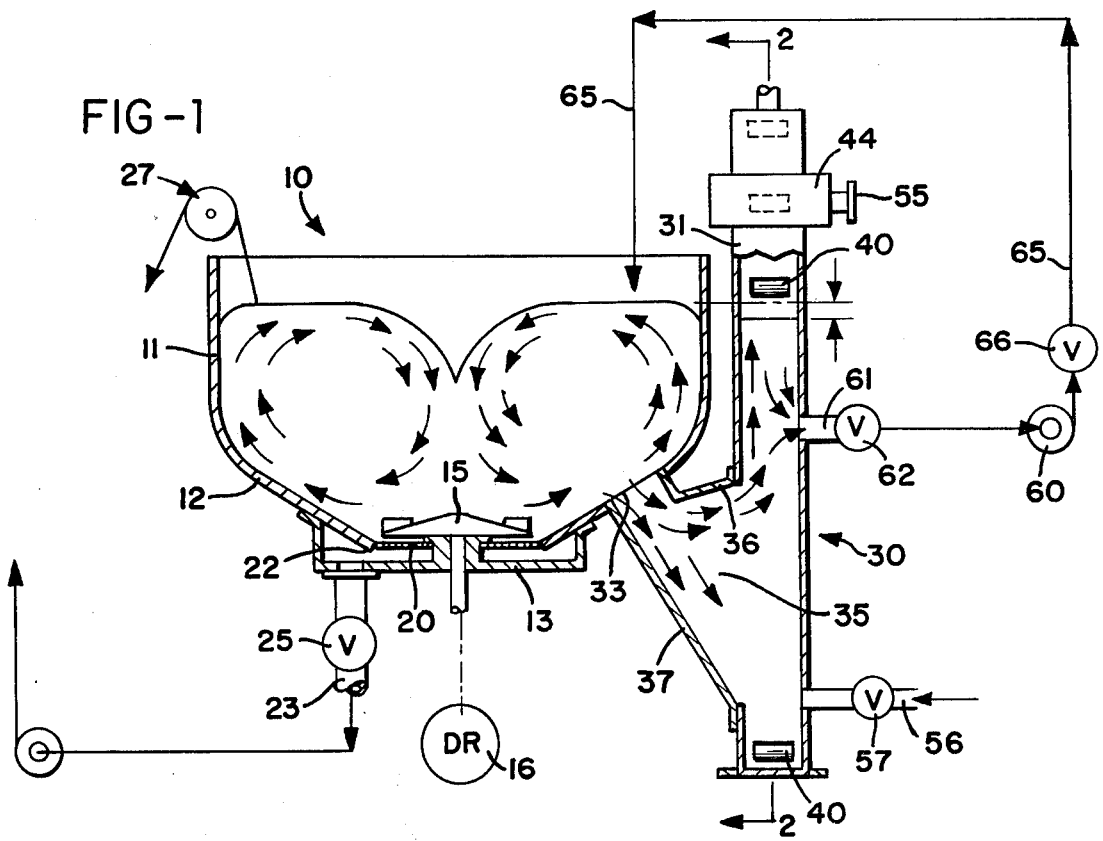
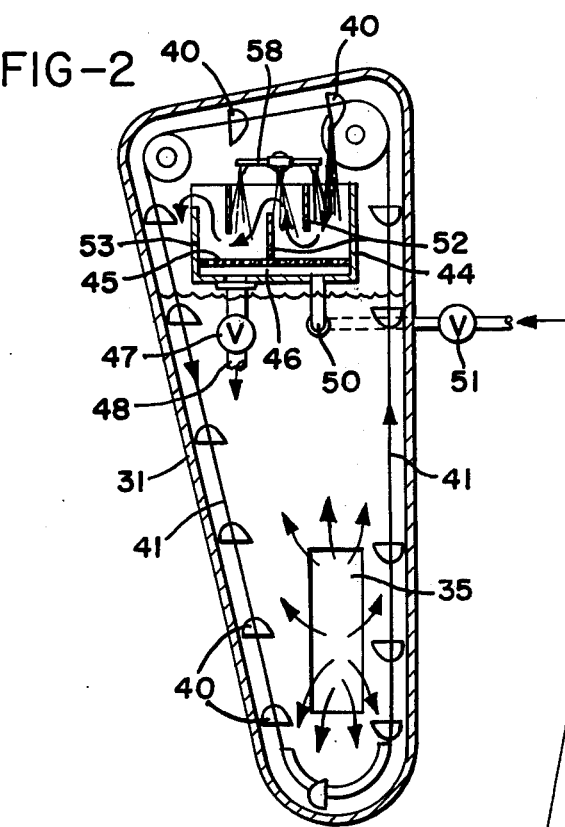
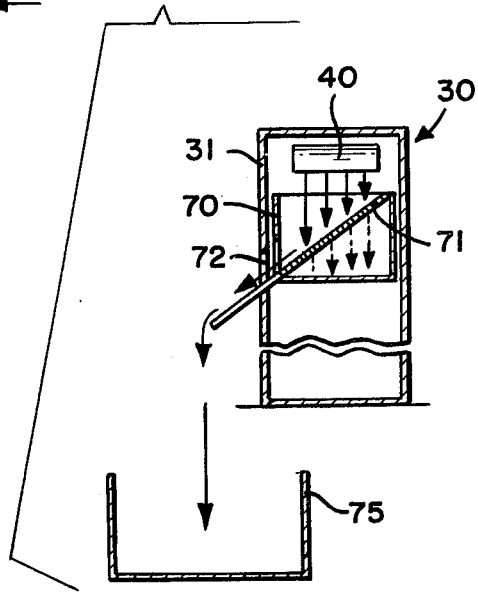

APPARATUS FOR PULPING WASTE PAPER MATERIALS

BACKGROUND OF THE INVENTION

This invention relates to the pulping of waste paper products for recovery of reusable paper making fibers therefrom, and especially to improvement of such pulping operations from the standpoints of both efficiency and high quality of yield.

A problem of increasing magnitude in the pulping of waste paper products has been the steady increase in the amount and nature of the contaminants mixed therewith in commercially obtainable waste paper, the contaminants now commonly averaging of the order of 15% by weight. Of particular importance is the amount of lightweight contaminant junk, primarily in the form of plastic products of many kinds and especially plastic sheet and film and also pieces of plastic foam.

In the past, many of the common contaminants of waste paper could be eliminated from the pulper tub by the use of a junk remover, a typical example being shown in Baxter U.S. Pat. No. 3,549,092. Such a junk remover relies on gravity discharge through a downward chute from the pulper tub of iron and other junk material of substantially higher specific gravity than paper fibers. But such junk removers have proved to be ineffective for removing lightweight junk, for two principal reasons.

One reason is the obvious one that material lighter than water will not readily flow down the chute which connects a pulper tub with its junk remover. The other is that the normal operation of a pulper rotor tends to force sufficient liquid from the tub to the junk remover when the pulping operation commences to maintain a higher static head in the junk remover than in the tub, commonly of the order of 12 inches. Further, the common practice is to add fresh liquid to the tub by way of the junk remover, in order to wash fiber back into the tub from the high specific gravity pieces traveling through the chute from the tub, and this increases the opposition to the flow of light materials from the tub.

The result of these conditions is that when a waste paper pulper — whether or not it is equipped with a junk remover — is operated on a continuous basis, with continuous extraction, through a perforate extraction plate, of a slurry of sufficiently small particle size and continuous replacement of water and furnish, plastic tends to accumulate in the tub until the amount of extracted fiber drops below an acceptable rate, a condition which the industry calls "constipated". It is then necessary to discontinue pulping and empty the accumulated junk manually from the tub.

The development of this condition has three significant disadvantages. Running of the pulper until the paper fiber can no longer be extracted produces increased and unnecessary wear on the pulper rotor and its extraction plate. In addition it results in extraction of a substantial amount of small plastic particles with the paper fiber, as the quantity of plastic in the tub increases to the point where it comes into contact with thr rotor, and such small pieces of plastic are difficult to separate from the paper fiber, especially if the holes in the extraction plate are small. At the same time, manual emptying of accumulated plastic is expensive and time consuming, and it also results in the loss of a substantial amount of a fiber which remains commingled with the plastic and is therefore eliminated along with the plastic.

SUMMARY OF THE INVENTION

The essence of the present invention lies in the discovery that these disadvantages of past practice can be overcome, and the effectiveness of a junk remover greatly improved, by maintaining the liquid level in the junk remover lower than in the pulper tub and thereby inducing liquid flow from the tub into the junk remover. In the practice of the invention, this is done by connecting the inlet of a pump to the junk remover casing at a level below the minimum operating level in the tub, and withdrawing liquid from the junk remover and recirculating it back to the tub under controlled conditions establishing the desired lower liquid level in the junk remover than in the tub, e.g. lower by about a few inches.

The effect of this removal of the normal static head conditions is first to induce flow through the cycle from the tub into the junk remover. Lightweight trash circulating in the tub will be entrained in that flow, and as soon as it enters the junk remover, it will rise to the top and thus be trapped against return to the tub. The resulting accumulation of lightweight trash at the top of the liquid in the junk remover is therefore readily lifted out for removal by the conveyor buckets which are standard equipment in a junk remover.

The pump used in the practice of the invention as described should be capable of handling pieces of sheet plastic as large as commonly occur in mixed commerical waste paper, but any such plastic and other lightweight trash which is taken in by the pump can be returned to the tub without affecting the effectiveness of the invention. Only a small part of the lightweight trash will be recirculated in this manner, and it will in due course return to the junk remover for reexposure to removal by the conveyor buckets. In fact, the invention is so effective that it has been practiced successfully to clear a pulper tub of lightweight junk by operating the pulper and junk remover while adding only sufficient water, and no furnish, to balance extraction, or with the extraction valve closed if there is no longer no fiber in the tub worth recovering.

While in its simplest form, the invention can be practiced satisfactorily by recirculating the withdrawn liquid directly back to the tub, more sophisticated provisions can also be made. For example, the pump output can be delivered to a coarse screening apparatus which will remove the large pieces of lightweight trash before returning the remainder to the pulper tub. Further such refinements are disclosed hereafter in connection with the drawings.

The invention has proved to be so effective in practical operation that in one full scale test installation, handling commerical waste paper containing approximately 15 percent trash, the pulper operated continuously at practical extration and horsepower rates when the recirculating pump was operated for only two 15-minute periods during each 8-hour shift. In this same installation, prior to application of the invention thereto, the junk remover had been so ineffective in eliminating lightweight trash that its use has been discontinued. It is of course apparent that more frequent use of the recirculating pump might be necessary where the quantities of lightweight trash are excessive as compared with the test installation noted, but this can readily be determined by observation.

In addition to the saving of time and manual labor provided by the invention, as well as the increased pulping effectiveness of the pulper, the invention provides further practical advantages. In particular, appropriately frequent elimination of lightweight trash from the tub in accordance with the invention greatly reduces the exposure of the rotor and extraction plate to the relatively abrasive action thereon provided by pieces of plastic. This in turn contributes directly to increasing the working life of the rotor and extraction plate.

It has been found especially practical to practice the invention in conjunction with a pulper equipped with an extraction plate having smaller holes than are commonly used for waste paper pulping, e.g. ⅛ to 3/16 inch holes. This results in substantially cleaner stock as extracted from the pulper, because of the greatly increased effectiveness of the junk remover in eliminating dirt, and the load on the cleaners downstream from the pulper ;is therefore correspondingly reduced.

BRIEF DESCRIPTION OF THE DRAWING

FIG. 1 is a somewhat diagrammatic view generally in vertical section showing a pulper and junk remover incorporating means for practicing the invention;

FIG. 2 is a diagrammatic view generally on the line 2—2 through the junk remover;

FIG. 3 is a fragmentary view similar to FIG. 2 showing another arrangement for collecting and removing trash from the upper portion of the junk remover.

DESCRIPTION OF THE PREFERRED EMBODIMENTS

Figure 4:
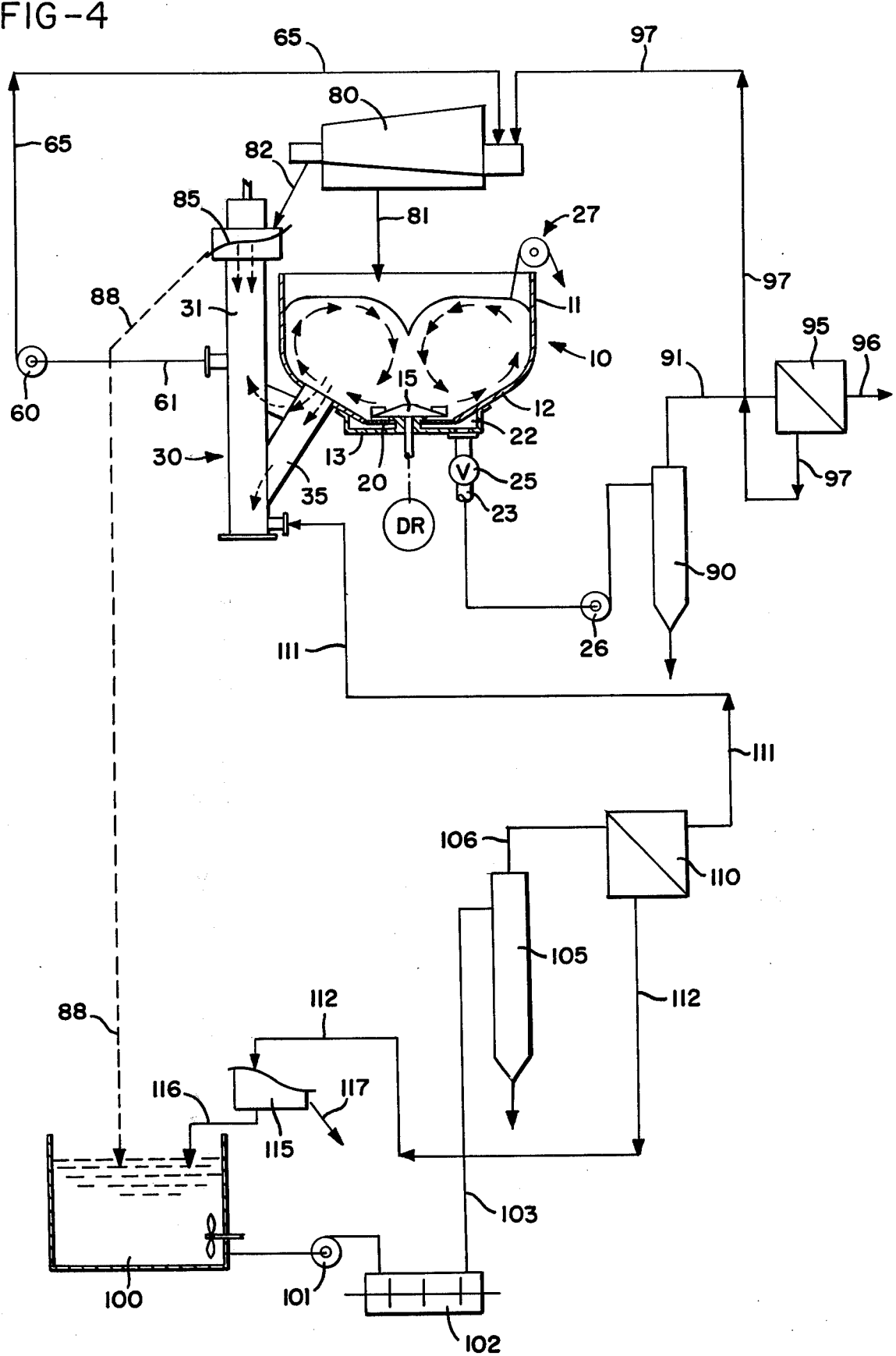
FIG. 4 is a diagrammatic view illustrating a modification of the arrangement of FIG. 1, and also incorporating an optional second stage cleaning and screening system.

In FIG. 1, the pulper 10 is generally of the construction disclosed in Felton-Vokes U.S. Pat. No. 3,339,851, and includes a cylindrical upper wall 11, an inwardly tapered lower wall portion 12, and a bottom wall 13. The rotor 15 is mounted for rotation on a vertical axis in the bottom of the tub and has a drive 16. A preforated extraction plate 20 positioned under the rotor 15 defines with the bottom wall 13 a chamber 22. For preferred results, the extraction plate 20 has relatively small perforations, e.g. ⅛ to 3/16 inch in diameter, and a discharge line 23 provided with a control valve 25 conducts stock extracted through plates 20 from chamber 22 to a pump 26 and the next station in the system. Usually, the pulper will be equipped with a ragger, indicated at 27, such as disclosed in Cowles U.S. Pat. No. 2,340,511 for removing materials such as wire and rope from the tub.

The junk remover indicated generally at 30 is of conventional construction and includes a casing or tower 31 at lest as high as, and preferably higher than, the tub 11. The tub includes an outlet 33 in its tapered wall portion 12 from which a chute 35 leads to the junk remover tower 31, the chute 35 having upwardly and downwardly inclined top and bottom walls 36 and 37.

The junk remover 30 is provided with a conveyor comprising a plurality of buckets 40 on endless chains 41. In operation, the buckets 40 collect heavy trash from the bottom of the tower 31 and dump it in a collection box 44 mounted in the upper portion of the tower at a location about the maximum normal liquid level in the tower. The form of collection box 44 shown in FIGS. 1 and 2 has a false bottom 45 comprising a perforate extraction plate through which water and fiber can drain to the chamber 46, and thence by way of valve 47 and pipe 48 to the liquid in the tower. A water supply line 50 having a valve 51 provides for flooding the box 44 through plate 45 to break up felting of paper fiber over the perforations in plate 45. The interior of the box 44 is provided with a series of alternating upper and lower weirs 52 for the purpose of trapping solid reject dumped in the right hand end of the box by the conveyor buckets while allowing liquid to overflow the left hand end wall 53 of the box with entrained fiber and other small particles to the lower portion of the tower. Collection box 44 is provided with a cleanout door 55 for manual emptying as required, which should be done often enough to prevent light trash from overflowing back into the tower.

In normal continuous use of this pulper and junk remover, waste paper products, ususally in bale form, are charged into the tub along with enough water to provide a total solids content from about 4–6 percent. As soon as the pulper has been operating long enough to reduce some of the paper to essentially defibered condition, i.e. to particle sizes which will pass through extraction plate 20, the extraction valve 25 is opened to withdraw extracted stock from chamber 22 under plate 20. Additional furnish, i.e. waste paper, and water are added at the rate necessary to maintain the consistency of the suspension in the tub in the desired percentage range.

Commonly, makeup water is added to the junk remover, as indicated by the line 56 and valve 57, so that the incoming water will wash fiber away from solid trash in the chute 35 back into the pulper while allowing the heavy junk to continue downwardly into position to be picked up by the conveyor buckets 40. In addition, water may be supplied as a shower at 58 at the top of the junk remover for washing fiber back into the interior of the tower from trash trapped in the collection box 44.

In the conventional operation of this apparatus as just summarized, the pumping action of the rotor 15 will operate through the chute 35 to build up and maintain the liquid in the junk remover tower 31 at a higher level than the operating level inside the tub. The water added through the pipe 56 also contributes to maintaining a higher static head in the tower than in the tub, and the difference in levels is commonly of the order of 12 inches. The result of this condition is that while heavy trash, i.e. metal and glass, will travel down the chute 35 from the tub to the bottom of the tower, lightweight trash such as plastic sheet and film, pieces of plastic foam, wood and the like cannot flow against the opposing head in the junk remover tower and therefore remain inside the tub.

When it is recognized that lightweight trash commonly averages as much as 15 percent of the waste paper furnish delivered to the tub, and since the majority of this material remains substantially unaffected by the mechanical and hydraulic shear forces which disintegrate the paper, it will be seen that the result is inevitably a steady increase in the amount of lightweight trash in the tub until it reaches a point at which the rotor is starved, and extraction of the desired slurry of fibers in water is reduced to a rate which is no longer useful.

These are the conditions which are successfully handled by the invention, and specifically, in the arragement of FIG. 1, by the provision of a pump 60 having its inlet connected at 61 to the tower 31 at a level below the minimum operating level in the pulper tub 11, but preferably above the point of entry of the chute 35 into the tower. The inlet line 61 of the pump 60 is provided with a control valve 62, and its outlet line 65, which also has a control valve 66 close to the pump, leads back to the tub 11. The characteristics of the pump 60 are not cirtical except that it should be capable of relatively higher volume operation while handling any of the floating trash which may be present in the tub 11 or tower 31, satisfactory results having been obtained with a WEMCO type pump.

The purpose and effect of the pump 60 are to reduce the liquid level in the tower 31 below the operating level in the tub, which simply means that the mixture of water, paper, and light trash must be recirculated back to the tub at a rate sufficient to create a higher hydrostatic head in the tub than in the junk remover tower — thus insuring a positive flow of liquid suspension from the tub to the tower. The degree in difference in head is not critical, and satisfactory results have been obtained with a difference of as little as three or four inches.

As soon as this head reversal has been effected, the immediate result is to encourage the flow of lightweight materials through the chute 35 into the tower, since there is now a posiitive pressure in the tub inducing that flow. The lightweight trash which could not escape from the tub will then begin to flow into the tower, and as soon as it enters the tower, it will tend to rise to the top of the liquid level in the tower and thus be trapped against return to the tub. As the lightweight trash accumulates at the top of the liquid in the tower, it will to an increasing extent be picked up by the conveyor buckets 40 and dumped into the collection box 44. Whatever lightweight trash is drawn into the inlet pipe 61 will be recirculated to the tub, but this will be at the most a small proportion of the total floating trash, and it will soon tend to return to the tower.

As previously noted, practice of the invention on a commercial sized waste paper pulping system has established that it is possible to keep the pulper tub practically free of lightweight trash by operating with pump 60 as little as for two 15-minute periods in the course of each eight hour shift. In fact, the installation in question has been operated continuously for as long as eighteen days without ever requiring that the pulper be shut down and manually emptied. Further, it is not even then necessary to empty the tub manually, because after the last furnish has been delivered to the tub and preparation is being made to shut the system down, operation of the pump 60 while adding decreasing quantities of makeup water will result in fully emptying the tub of trash by way of the junk remover. Of course, if the furnish contains an unusual proportion of lightweight trash, or is otherwise unusually dirty, the pump 60 can be most unusual if there were any reason to operate it more often than a minor proportion of each shift.

The invention thus provides a number of significant practical advantages. In addition to eliminating the necessity for manual cleanup of the tub, it promotes a longer service life for the rotor and extraction plate because the periodic elimination of lightweight trash, which tends to be somewhat abrasive, correspondingly minimizes wear of both the rotor and extraction plate. A further most important advantage, especially when the extraction plate is provided with relatively small holes as stated, is that the extracted slurry is unusually free of contaminants, particularly small plastic pieces as well as dirt, and this greatly reduces the load on and wear of the subsequent cleaning and screening stations which are necessary to complete preparation of the recovered fiber for reuse.

FIG. 3 shows a variation of the provision for handling the material picked up by the furnish remover conveyor buckets 40. In FIG. 3, the collection box 70 has a slanted bottom plate 71 which extends through an opening 72 in the side of the tower 31 into overhanging relation with a bin 75. The portion of slanted bottom plate 71 within the box 70 is shown as perforate so that liquid can drain therethrough into the tower along with fiber and other small particles. This collection box arrangement may be provided also with one or more showers discharging from the top of the tower to rinse fiber free from the trash which accumulates in the box. It should also be noted that the invention is in no way limited to any particular type of pulper or rotor arrangement therein, so long as the pulper has an associated junk remover. Typical such other pulpers include a square tub as in U.S. Pat. No. 3,417,933 and a side-mounted rotor as in U.S. Pat. No. 2,703,533.

FIG. 4 shows a more complex system which adds screening and cleaning stations for maximixing the recovery of good fiber. The pulper 10 is shown as of the same construction and other characteristics as in FIG. 1, and the other parts in FIG. 4 which correspond directly to parts in FIG. 1 are provided with similar reference characters. Instead of connecting the output of pump 60 directly back to the pulper, however, it leads to the inlet of a coarse screening apparatus 80 such, for example, as an unit of the construction shown in Murphy U.S. Pat. No. 2,060,685.

Such screening apparatus includes a perforated cone and is designed to separate fiber and other relatively small particles from whatever large pieces of floating trash are being recirculated from the pump 60, and such accepts from the unit 80 as shown as returned at 81 to the pulper 10. The rejects from the unit 80 are discharged at 82 and delivered to a vibrating screen 85 mounted in the top of the tower 31 in place of the collection box 44 and of any conventional flat bed vibrating type, such as a Jonnson screen. The accepts from screen 85 fall into the tower 31, and the rejects are discharged at 88.

The extracted stock from the pulper 10 is supplied by the pump 26 to a centrifugal cleaner 90 from which accepts line 91 leads to a screen, such particularly of the construction shown in Martindale U.S. Pat. No. 2,835,173 or Seifert U.S. Pat. No. 3,849,302, and the accepts line 96 from screen 95 leads to the next station, which may be a paper machine. The rejects line 97 from screen 95 leads back to the inlet of the coarse screen 80 for return therethrough to the screen 85 and tower 31.

The portion of the system shown in the lower half of FIG. 4 is an optional arrangement for the purpose of reclaiming additional fiber from the material rejected by the screen 85. The discharge line 88 from screen 85 leads to an agitator chest 100 where it is diluted sufficiently for further treatment and then supplied by a pump 101 to a deflaker 102 of any conventional construction, for example as shown in Vokes U.S. Pat. No. 3,877,648, for separating the fibrous constituents of the material from the plastic and other reject.

A line 103 leads the output of deflaker 102 to a centrifugal cleaner 105 whose accepts line 106 connects with a screen 110, which may be of the same construction as the screen 95 but will preferably accept somewhat larger particles than the screen 95. The accepts from the screen 110, which comprise the fibrous constituents of the reject from line 88, are led back by a line 111 to the tower 31 for further pulping in the pulper 10. The discharge line 112 from screen 110 leads to a vibrating screen 115 from which the accepts are returned at 116 to the chest 100 while the reject is discarded at 117; alternatively the material from the discharge line 112 could be discarded if its fiber content does not justify further processing.

While the methods and forms of apparatus herein described constitute preferred embodiments of the invention, it is to be understood that the invention is not limited to these precise methods and forms of apparatus, and that changes may be made therein without departing from the scope of the invention.

What is claimed is:

1. Apparatus for recovering paper making fiber from waste paper products including substantial quantities of plastic film and other lightweight non-paper contaminants, comprising:
   a. a tub for receiving such waste paper products and water to at least a predetermined minimum level,
   b. a rotor mounted for rotation in said tub to pulp such waste paper products to aqueous slurry form,
   c. means for extracting from said tub a liquid suspension of small particles of less than a predetermined maximum size,
   d. an outlet in said tub bottom separate from said extracting means,
   e. junk removing means including a casing adjacent said tub and of at least the same height,
   f. a chute connecting said outlet with said casing and providing for liquid flow between said tub and said casing,
   g. a pump having its inlet connected with said casing at a level below said minimum level in said tub,
   h. means for driving said pump to withdraw sufficient liquid from said casing to maintain the liquid level in said casing below that in said tub and thereby to induce flow of liquid and lightweight contaminants from said tub to said casing by way of said chute,
   i. means connecting the outlet of said pump with said tub to recirculate withdrawn liquid back into said tub, and
   j. means for collecting lightweight contaminants in the upper portion of said casing for removal therefrom.

2. Apparatus as defined in claim 1 further comprising means connected with said outlet of said pump for removing lightweight contaminants from the withdrawn liquid prior to return thereof to said tub.

3. Apparatus as defined in claim 2 further comprising means for defibering said removed contaminants, and means for returning said defibered contaminants to said tub for further pulping action.

4. Apparatus as defined in claim 2 further comprising means for defibering said removed contaminants, means for screening the fibrous constituents of said defibered contaminants from the remainder thereof, and means for returning said fibrous constituents to said tub for further pulping action.

5. Apparatus as defined in claim 1 wherein said extracting means includes an extraction plate having perforation therethrough in the range of approximately ⅛ to 3/16 inch in diameter.

6. In apparatus for recovering paper making fiber from waste paper products including substantial quantities of plastic film and other lightweight non-paper contaminants, including
   a. a tub for receiving such waste paper products and water to at least a predetermined minimum level,
   b. a rotor mounted for rotation in said tub to pulp such waste paper products to aqueous slurry form,
   c. means for extracting from said tub a liquid suspension of small particles of less than a predetermined maximum size,
   d. an outlet in said tub bottom separate from said extracting means,
   e. junk removing means including a casing adjacent said tub and of at least the same height, and
   f. a chute connecting said outlet with said casing and providing for liquid flow between said tub and said casing,
      i. the improvement comprising a pump having its inlet connected with said casing at a level below said minimum level in said tub,
      ii. means for driving said pump to withdraw sufficient liquid from said casing to maintain the liquid level in said casing below that in said tub and thereby to induce flow of liquid and lightweight contaminants from said tub to said casing by way of said chute,
      iii. means connecting the outlet of said pump with said tub to recirculate withdrawn liquid back into said tub, and
      iv. means for collecting lightweight contaminants in the upper portion of said casing for removal therefrom.

7. The method of operating apparatus for recovering paper making fiber from waste paper products including substantial quantities of plastic film and other lightweight non-paper contaminants which comprises:
   a. a tub for receiving such waste paper products and water to at least a predetermined minimum level,
   b. a rotor mounted for rotation in said tub to pulp such waste paper products to aqueous slurry form,
   c. means for extracting from said tub a liquid suspension of small particles of less than a predetermined maximum size,
   d. an outlet in said tub bottom separate from said extracting means,
   e. junk removing means including a casing adjacent said tub and of at least the same height, and
   f. a chute connecting said outlet with said casing and providing for liquid flow between said tub and said casing, which method comprises the steps of:
      i. intermittently withdrawing liquid from said casing at a level below said minimum level in said tub at a sufficient rate to reduce the liquid level in said casing below that in said tub and thereby to induce flow of liquid and lightweight contaminants from said tub to said casing by way of said chute,
      ii. collecting and removing the lightweight contaminants which accumulate in the upper portion of said casing, and
      iii. recirculating said withdrawn liquid back to said tub.

8. The method as defined in claim 7 further comprising the step of removing lightweight contaminants from said withdrawn liquid prior to return thereof to said tub.

* * * * *

UNITED STATES PATENT AND TRADEMARK OFFICE
CERTIFICATE OF CORRECTION

PATENT NO. : 4,030,671
DATED : June 21, 1977
INVENTOR(S) : Joseph W. Couture

It is certified that error appears in the above-identified patent and that said Letters Patent are hereby corrected as shown below:

Column 2, line 63, "has" should be --had--.

Column 3, line 43, "preforated" should be --perforated--.

Column 3, line 57, "lest" should be --least--.

Column 5, line 58, following "can be" the following line was omitted; "operated correspondingly more often, but it would be".

Signed and Sealed this

Twentieth Day of September 1977

[SEAL]

Attest:

RUTH C. MASON
Attesting Officer

LUTRELLE F. PARKER
Acting Commissioner of Patents and Trademarks